United States Patent Office 3,536,765
Patented Oct. 27, 1970

3,536,765
3,3,3-TRIFLUORO-2-(TRIFLUOROMETHYL) PROPENYL ALLYL SULFIDES
Maynard S. Raasch, Wilmington, Del., assignor to E. I. du Pont de Nemours and Company, Wilmington, Del., a corporation of Delaware
No Drawing. Filed June 19, 1967, Ser. No. 647,235
Int. Cl. C07c *149/16, 149/26;* C08f *45/46*
U.S. Cl. 260—609   11 Claims

ABSTRACT OF THE DISCLOSURE 3,3,3-trifluoro-2-(trifluoromethyl)propenyl allyl sulfides produced by the reaction of bis(trifluoromethyl)thioketene with a compound having an allylic hydrogen are claimed. The sulfides are useful as plasticizers for thiocarbonyl halide polymers.

FIELD OF THE INVENTION

This invention relates to ethylenically unsaturated fluorinated organosulfur compounds and to the process for their preparation.

SUMMARY OF THE INVENTION

This invention is directed to 3,3,3-trifluoro-2-(trifluoromethyl)propenyl allyl sulfides of the formula:

$$(CF_3)_2C=CH-S-Q$$

wherein Q is a hydrocarbyl group which (a) contains 3-30 carbon atoms; (b) has an acyclic or cyclic ethylenic double bond in a $\beta,\gamma$-position relative to the sulfur atom, i.e., an allylic system,

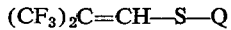

directly attached to the sulfur atom; (c) contains at most two nonaromatic carbon-carbon double bonds, and (d) when acyclic and containing only one ethylenic double bond can be substituted with a group selected from chlorine, fluorine or alkoxy of 1–6 carbons.

The products of this invention are produced by reacting, at a temperature of 0–150° C., bis(trifluoromethyl)-thioketene with a compound of up to 30 carbons having the allylic system

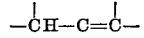

and at most two nonaromatic carbon-carbon double bonds; said compound can contain one of the substituents: chlorine, fluorine and alkoxy of 1–6 carbons when the compound is acyclic and contains only one ethylenic double bond.

The products of this invention are useful as plasticizers for certain sulfur containing polymers.

DESCRIPTION OF THE PREFERRED EMBODIMENTS

More specifically, this invention is directed to the compounds selected from the group consisting of compounds of the formulae:

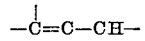

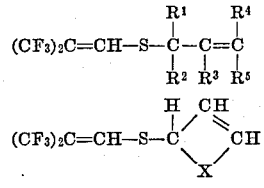

and

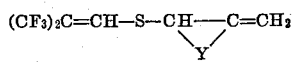

wherein $R^1$, $R^2$, $R^3$, $R^4$ and $R^5$ together contain not more than 27 carbons and each is R—, Cl—R—, F—R—, alkoxy-R—, chlorine, fluorine, alkoxy of 1–6 carbons, R— is alkyl of up to 10 carbons, alkenyl of up to 10 carbons, cycloalkyl of 4–6 carbons, cycloalkenyl of 5–6 carbons, carbocyclic aryl of up to 10 carbons, and alkoxy of 1–6 carbons with the proviso that not more than one $R^1$, $R^2$, $R^3$, $R^4$ or $R^5$ is chlorine, fluorine, lower alkoxy, Cl—R—, F—R—, alkoxy-R—, alkenyl or cycloalkenyl; X is a divalent radical of 2–5 carbons selected from alkylene or alkenylene which can form part of a carbocyclic ring of up to 7 carbons having at most one nonaromatic carbon-carbon double bond; and Y is a divalent carbocyclic radical of up to 5 carbons which contains at most one nonaromatic carbon-carbon double bond.

The compounds of this invention are produced by heating and contacting, at a temperature of 0–150° C., bis-(trifluoromethyl)thioketene and an allylic compound selected from the group consisting of compounds of the formulae:

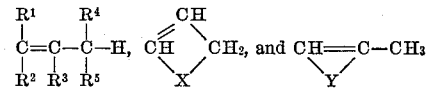

wherein $R^1$, $R^2$, $R^3$, $R^4$, $R^5$, X and Y are as defined above.

This reaction, which involves a shift in the double bond of the unsaturated compound, is represented schematically by the following equation:

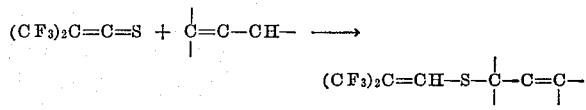

The reaction between bis(trifluoromethyl)thioketene and unsaturated is generally carried out at temperatures from 0 to 150° C. The most suitable temperature varies with the reactivity of the particular olefin employed. As shown in the examples that follow, the reaction is often exothermic and many olefins react at or below room temperature. Within the range of 0 to 150° C. substantial conversions are obtained in a short time and it is generally unnecessary to prolong the reaction time beyond about 20 hours. Since bis(trifluoromethyl)thioketene boils at 52° C., operation above this temperature is best carried out in a closed vessel under the autogenous pressure developed by the reaction components. Likewise, a closed vessel is used for the gaseous unsaturates. However, it is also possible to pass the reactants at or near atmospheric pressure through a reaction zone, such as a tube, heated to the desired temperature in a continuous process.

The reaction is conveniently carried out in the absence of a solvent but, if desired, an inert organic liquid can be used as the solvent or reaction medium. Suitable non-reactive solvents include the hydrocarbons and halohydrocarbons free from aliphatic unsaturation such as n-hexane, cyclohexane, benzene, toluene, dichloromethane, carbon tetrachloride, dichlorotetrafluoroethane, 1,1,2-trichloro-1,2,2-trifluoroethane, chlorobenzene, and the like.

The relative proportions of the two reactants are not critical, as the reaction will proceed regardless of what they are. As a matter of convenience, approximately equimolar amounts are normally used, but an excess of one or the other reactant can be employed.

The products can be isolated and purified by the conventional processes of distillation and/or crystallization.

The starting material, bis(trifluoromethyl)thioketene, and its preparation, are described in U.S. Pat. 3,275,609. The unsaturated compounds to be reacted with bis(trifluoromethyl)thioketene are well known and many of them are commercial chemicals.

The following examples illustrate the invention in greater detail. In all cases, the proton and $F^{19}$ nuclear magnetic resonance spectra were consistent with the structures assigned to the various products.

EXAMPLE 1

3,3,3-trifluoro-2-(trifluoromethyl)propenyl allyl sulfide

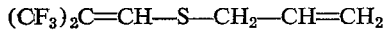
$(CF_3)_2C=CH-S-CH_2-CH=CH_2$

A Carius tube was charged with 5.5 ml. (ca. 0.08 mole) of propylene at $-80°$ C. and 9.7 g. (0.05 mole) of bis(trifluoromethyl)thioketene. The tube was sealed and heated at 100° C. for 3 hours. Distillation gave 7.2 g. (61% yield) of the sulfide, B.P. 52.5–53° C./15 mm., $n_D^{25}$ 1.4039.

*Analysis.*—Calcd. for $C_7H_6F_6S$ (percent): C, 35.59; H, 2.56; S, 13.57. Found (percent): C, 35.09; H, 2.62; S, 13.74.

EXAMPLE 2

3,3,3-trifluoro-2-(trifluoromethyl)propenyl 1,1,2-trimethylallyl sulfide

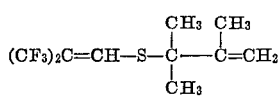

To 8 g. (0.095 mole) of 2,3-dimethyl-2-butene was added 7.1 g. (0.037 mole) of bis(trifluoromethyl)thioketene. Reaction took place with slight evolution of heat. Distilaltion gave 8.9 g. (88% yield) of the sulfide, B.P. 58° C./7 m., $n_{D25}$ 1.4200.

*Analysis.*—Calcd. for $C_{10}H_{12}F_6S$ (percent): C, 43.15; H, 4.35; S, 11.52. Found (percent): C, 43.78; H, 4.51; S. 11.28.

EXAMPLE 3

3,3,3-trifluoro-2-(trifluoromethyl)propenyl cyclopenten-1-yl sulfide

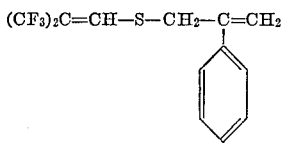

A mixture of 3.90 g. (0.035 mole) of α-methylstyrene and 5.82 g. (0.03 mole) of bis(trifluoromethyl)thioketene was allowed to stand for 20 hours. Distillation gave 6.1 g. of a mixture of the above sulfide and 2-hexafluoroisopropylidene-4-methyl-4-phenylthietane. These compounds were separated on a gas chromatography column containing 20% of octylphenoxypolyethyleneoxyethanol on firebrick at 175° C. The sulfide came off second and comprised 39% of the mixture. Refractive index, $n_D^{25}$ 1.4916.

*Analysis.*—Calcd. for $C_{13}H_{10}F_6S$ (percent): C, 50.00; H, 3.23; S, 10.27. Found (percent): C, 50.02; H, 3.13; S, 10.02.

EXAMPLE 4

3,3,3-trifluoro-2-(trifluoromethyl)propenyl 2-cyclopenten-1-yl sulfide

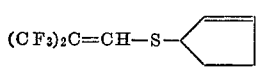

To 4.08 g. (0.06 mole) of cyclopentene was added in portions with occasional cooling in ice 5.82 g. (0.03 mole) of bis(trifluoromethyl)thioketene. The color of the thioketene soon disappeared and the product was distilled to give 7.0 g. (89% yield) of the sulfide, B.P. 97–99° C./32 mm., $n_D^{25}$ 1.4345.

*Analysis.*—Calcd. for $C_9H_8F_6S$ (percent): C, 41.33; H, 3.08; S, 12.23. Found (percent): C, 40.85; H, 3.05; S, 12.34.

EXAMPLE 5

3,3,3-trifluoro-2-(trifluoromethyl)propenyl 2-cyclohexen-1-yl sulfide

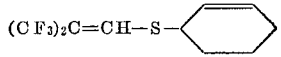

The reaction was carried out as in Example 4 but using cyclohexene. The product was obtained in 72% yield and distilled at 112–114° C./29 mm., $n_D^{25}$ 1.4455.

*Analysis.*—Calcd. for $C_{10}H_{10}F_6S$ (percent): C, 43.48; H, 3.65; S, 11.61. Found (percent): C, 43.10; H, 3.58; S, 11.81.

EXAMPLE 6

6-[3,3,3-trifluoro-2-(trifluoromethyl)propenylthio]-1,4-cyclooctadiene

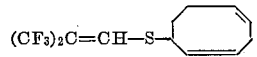

Bis(trifluoromethyl)thioketene (5.82 g., 0.03 mole) was added to 13 g. (0.12 mole) of 1,5-cyclooctadiene. After the mixture had stood for 3 hours, it was distilled to give 4.5 g. (50% yield) of the sulfide, B.P. 49° C./0.05 mm., $n_D^{25}$ 1.4630.

*Analysis.*—Calcd. for $C_{12}H_{12}F_6S$ (percent): C, 47.68; H, 4.00; S, 10.61. Found (percent): C, 47.82; H, 4.08; S, 10.51.

EXAMPLE 7

1-[3,3,3-trifluoro-2-(trifluoromethyl)propenylthio]-3a,4,7,7a-tetrahydro-4,7-methanoindene

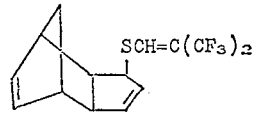

To 3.96 g. (0.03 mole) of freshly-distilled dicyclopentadiene was added 5.82 g. (0.03 mole) of bis(trifluoromethyl)thioketene with cooling in ice and stirring. After 20 hours the product was distilled to give 9.0 g. (92% yield) of the sulfide, B.P. 70° C./0.1 mm., $n_D^{25}$ 1.4773.

*Analysis.*—Calcd. for $C_{14}H_{12}F_6S$ (percent): C, 51.53; H, 3.71; S, 9.83. Found (percent): C, 50.97; H, 3.80; S, 9.99.

EXAMPLE 8

3-[3,3,3-trifluoro-2-(trifluoromethyl)propenylthio]-2(10)-pinene

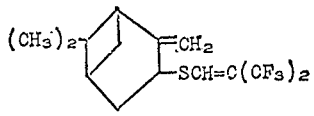

To 4.76 g. (0.035 mole) of freshly distilled α-pinene was added 6.79 g. of bis(trifluoromethyl)thioketene with occasional cooling and the mixture was allowed to stand overnight. Distillation gave 9.9 g. (85% yield) of the sulfide, B.P. 69–70° C./0.35 mm., $n_D^{25}$ 1.4568–1.4605.

*Analysis.*—Calcd. for $C_{14}H_{16}F_6S$ (percent): C, 50.91; H, 4.88; S, 9.71. Found (percent): C, 51.54; H, 4.98; S, 9.62.

The $F^{19}$ and proton NMR spectra show that two isomers are present. These arise from the new asymmetric center in the ring adjacent to the sulfur group.

EXAMPLE 9

5-methylene-6-[3,3,3-trifluoro-2-(trifluoromethyl)propenylthio]-2-norbornene

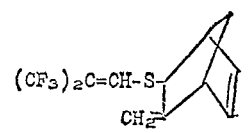

Bis(trifluoromethyl)thioketene was added to an equimolar amount of 2-methyl-2,5-norbornadiene below 40° C. After one hour the product was distilled to give an 83% yield of the sulfide, B.P. 91° C./4.6 mm., $n_D^{25}$ 1.4668.

*Analysis.*—Calcd. for $C_{12}H_{10}F_6S$ (percent): C, 48.00; H, 3.36; S, 10.68. Found (percent): C, 47.76; H, 3.65; S, 10.82.

EXAMPLE 10

3,3,3-trifluoro-2-(trifluoromethyl)propenyl 3-chloroallyl sulfide $(CF_3)_2C=CH-S-CH_2-CH=CHCl$ Bis(trifluoromethyl)thioketene was heated in a sealed vessel with a 1.3-mole equivalent of allyl chloride at 100° C. for 16 hours. Distillation gave a 23% yield of the sulfide, B.P. 68° C./8 mm., $n_D^{25}$ 1.4319.

*Analysis.*—Calcd. for $C_7H_5ClF_6S$ (percent): C, 31.07; H, 1.86; S, 11.85. Found (percent): C, 30.79; H, 1.79; S, 12.36.

The proton NMR spectrum showed this product to be a mixture of the cis and trans forms.

EXAMPLE 11

3,3,3-trifluoro-2-(trifluoromethyl)propenyl 1-(4-methoxyphenyl)allyl sulfide

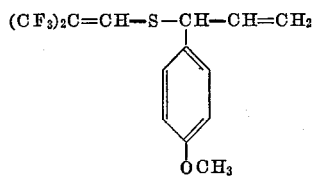

Equimolar amounts of anethole and bis(trifluoromethyl)thioketene were mixed and allowed to stand for 16 hours. The product was recrystallized from methanol to give a 72% yield of the sulfide in two crops, M.P. 75.5–76° C.

*Analysis.*—Calcd. for $C_{14}H_{12}F_6OS$ (percent): C, 49.12; H, 3.54; S, 9.36. Found (percent): C, 49.65; H, 3.77; S, 9.42.

EXAMPLE 12

3,3,3-trifluoro-2-(trifluoromethyl)propenyl 3-phenylallyl sulfide $(CF_3)_2C=CH-S-CH_2-CH=CH-C_6H_5$ Bis(trifluoromethyl)thioketene was heated in a sealed tube with a 1.1 molar equivalent of allylbenzene for 2 hours at 100° C. Distillation of the reaction product gave a 70% yield of the sulfide, B.P. 73–77° C./0.1 mm., $n_D^{25}$ 1.5062.

*Analysis.*—Calcd. for $C_{13}H_{10}F_6S$ (percent): C, 50.00; H, 3.23; S, 10.27. Found (percent): C, 49.95; H, 3.37; S, 10.68.

By applying the described procedure to the reaction of bis(trifluoromethyl)thioketene with other unsaturates of the type previously defined, other 3,3,3-trifluoro-2-(trifluoromethyl)propenyl allyl sulfides of this invention are similarly obtained. These products have the general formula $(CF_3)_2C=CH-S-Q$, where Q has the previously stated significance, and is therefore characterized by the presence of an allylic system, —C—C=C—, attached to the sulfur atom through its singly bonded carbon. Additional representative examples of products of this invention are shown in the table below. In this table, the unsaturates reacted with bis(trifluoromethyl)thioketene are named in the left-hand column. The right-hand column, for brevity, lists only the radical Q of the reaction product by name and formula. It will be understood that, in each case, the complete formula of the reaction product is the radical formula preceded by $(CF_3)_2C=CH-S-$.

| Unsaturate | Q |
|---|---|
| 1-butene | 2-butenyl |
| | $-CH_2-CH=CH-CH_3$ |
| 2-butene | 1-methylallyl |
| | $-CH-CH=CH_2$ <br> \| <br> $CH_3$ |
| 1-tridecene | 2-tridecenyl |
| | $-CH_2-CH=CH-(CH_2)_9-CH_3$ |
| 1-triacontene | 2-triacontenyl |
| | $-CH_2-CH=CH-(CH_2)_{26}-CH_3$ |
| Allylcyclopentane | 3-cyclopentylallyl |
| | $-CH_2-CH=CH-C_5H_9$ |
| 2,3-dimethyl-1-pentene | 2,3-dimethyl-2-pentenyl |
| | $-CH_2-C=C-CH_2-CH_3$ <br> \|  \| <br> $CH_3$ $CH_3$ |
| 4,4-dimethyl-2-pentene | 1-(t-butyl)allyl |
| | $-CH-CH=CH_2$ <br> \| <br> $CH_3-C-CH_3$ <br> \| <br> $CH_3$ |
| 2,4,4-trimethyl-1-pentene | 2,4,4-trimethyl-2-pentenyl |
| | $\quad\quad\quad\quad CH_3$ <br> $-CH_2-C=CH-C-CH_3$ <br> \| \| <br> $CH_3$ $CH_3$ |
| Diallyl | 2,5-hexadienyl |
| | $-CH_2-CH=CH-CH_2-CH=CH_2$ |
| p-Diisopropenylbenzene | 2-(4-isopropenylphenyl)allyl |
| | $-CH_2-C=CH_2$ <br> \| <br> $C_6H_4-C=CH_2$ <br> \| <br> $CH_3$ |
| 1-propenylnaphthalene | 1-(1-naphthyl)allyl |
| | $-CH-CH=CH_2$ <br> \| <br> $C_{10}H_7$ |
| Ethylidenecyclohexane | 1-vinylcyclohexyl |
| | 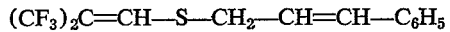 |
| 1,4-cyclohexadiene | 2,4-cyclohexadien-1-yl |
| | 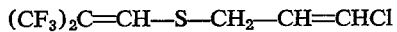 |
| Allyl fluoride | 3-fluoroallyl |
| | $-CH_2-CH=CHF$ |
| 1-chloro-9-octadecene | 1-(8-chlorooctyl)-2-decenyl |
| | $-CH-CH=CH-(CH_2)_6-CH_3$ <br> \| <br> $(CH_2)_7-CH_2Cl$ |
| 5-fluoro-1-pentene | 5-fluoro-2-pentenyl |
| | $-CH_2-CH=CH-CH_2-CH_2F$ |
| 1-allyl-4-chlorobenzene | 3-(4-chlorophenyl)allyl |
| | $-CH_2-CH=CH-C_6H_4Cl$ |
| Allyl methyl ether | 3-methoxyallyl |
| | $-CH_2-CH=CH-OCH_3$ |
| 3-butenyl hexyl ether | 4-hexoxy-2-butenyl |
| | $-CH_2-CH=CH-CH_2-O-C_6H_{13}$ |
| 1-propenyl-4-ethoxynaphthalene | 1-(4-ethoxy-1-naphthyl)allyl |
| | $-CH-CH=CH_2$ <br> \| <br> $C_{10}H_6-OC_2H_5$ |

| Unsaturate | Q |
|---|---|
| 2-methylene-5-norbornene | 2,5-norbornadien-2-ylmethyl |
| 3a,4,5,6,7,7a-hexahydro-4,7-methanoindene. | 3a,4,5,6,7,7a-hexahydro-4,7-methanoinden-1-yl. |

The 3,3,3-trifluoro-2-(trifluoromethyl)propenyl allyl sulfides of this invention are useful as plasticizers for the thiocarbonyl fluoride and thiocarbonyl chlorofluoride polymers of U.S. Pat. 3,240,765. These valuable polymers are deficient in flow properties. They crystallize at room temperature and, during crystallization, change from an elastomeric to a rigid form. The compounds of this invention increase the flowability of the polymer in molding operations and inhibit the loss of desirable elastic properties. The plasticizer may be incorporated into the polymer by soaking four parts of polymer in a solution of one part of a compound of this invention dissolved in 1.5 parts of chloroform. The swollen polymer is then dried at 80° C. and may be molded at 150° C.

The plasticizing effects of the compounds are not limited to the above specialty polymers. Vinyl polymers, such as polyvinyl chloride and polyvinyl acetate, and rubbers may also be plasticized with them. These unsaturated plasticizers may be modified and their volatility reduced by additions to the double bonds, e.g., addition of chlorine.

Products of this invention derived from the higher olefinic compounds are also useful as lubricants and hydraulic fluids.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound selected from the group consisting of:

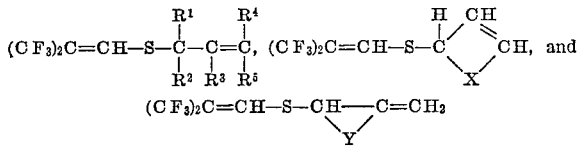

wherein:
(a) $R^1$, $R^2$, $R^3$, $R^4$ and $R^5$ together contain not more than 27 carbons and each is hydrogen, Cl, F, alkoxy of 1–6 carbons, R—, Cl—R—, F—R—, or alkoxy-R—
where R is:
(i) alkyl of up to 10 carbons, alkenyl of up to 10 carbons, cycloalkyl of 4–6 carbons, cycloalkenyl of 5–6 carbons, or carbocyclic aryl of up to 10 carbons; and
(ii) alkoxy of 1–6 atoms; with the proviso that not more than one $R^1$, $R^2$, $R^3$, $R^4$ or $R^5$ is Cl, F, alkoxy, Cl—R—, F—R—, alkoxy-R—, alkylene or cycloalkylene;
(b) X is a divalent radical of 2–5 carbons selected from alkylene or alkenylene which can form part of a carbocyclic ring of up to 7 carbons having at most one nonaromatic carbon-carbon double bond; and
(c) Y is a divalent carbocyclic radical of up to 5 carbons which contains at most one nonaromatic carbon-carbon double bond.

2. The compound of claim 1 being 3,3,3-trifluoro-2-(trifluoromethyl)propenyl allyl sulfide.
3. The compound of claim 1 being 3,3,3-trifluoro-2-(trifluoromethyl)propenyl 1,1,2-trimethylallyl sulfide.
4. The compound of claim 1 being 3,3,3-trifluoro-2-(trifluoromethyl)propenyl 2-phenylallyl sulfide.
5. The compound of claim 1 being 3,3,3-trifluoro-2-(trifluoromethyl)propenyl 2-cyclopentene-1-yl sulfide.
6. The compound of claim 1 being 3,3,3-trifluoro-2-(trifluoromethyl)propenyl 2-cyclohexen-1-yl sulfide.
7. The compound of claim 1 being 6-[3,3,3-trifluoro-2-(trifluoromethyl)propenylthio]-1,4-cyclooctadiene.
8. The compound of claim 1 being 1-[3,3,3-trifluoro-2 - (trifluoromethyl)propenylthio] - 3a,4,7,7a - tetrahydro-4,7-methanoindene.
9. The compound of claim 1 being 3-[3,3,3-trifluoro-2-(trifluoromethyl)propenylthio]-2(10)-pinene.
10. The compound of claim 1 being 5-methylene-6-[3,3,3 - trifluoro - 2 - (trifluoromethyl)propenylthio]-2-norbornene.
11. The compound of claim 1 being 3,3,3-trifluoro-2-(trifluoromethyl)propenyl 3-chloroallyl sulfide.

References Cited

UNITED STATES PATENTS 3,052,726   9/1962   Middleton _____ 260—609

CHARLES B. PARKER, Primary Examiner

D. R. PHILLIPS, Assistant Examiner

U.S. Cl. X.R.

260—30.8, 470, 481